United States Patent
Nakajima et al.

(10) Patent No.: US 10,662,392 B2
(45) Date of Patent: May 26, 2020

(54) LUBRICATING OIL COMPOSITION FOR REFRIGERATOR, COMPOSITION FOR REFRIGERATOR, LUBRICATING METHOD, AND REFRIGERATOR

(71) Applicant: IDEMITSU KOSAN CO., LTD., Chiyoda-ku (JP)

(72) Inventors: So Nakajima, Edogawa-ku (JP); Masato Kaneko, Ichihara (JP); Tetsuhiko Fukanuma, Kariya (JP); Ryo Matsubara, Kariya (JP); Yuki Yokoi, Kariya (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 15/776,185

(22) PCT Filed: Nov. 18, 2016

(86) PCT No.: PCT/JP2016/084209
§ 371 (c)(1),
(2) Date: May 15, 2018

(87) PCT Pub. No.: WO2017/086422
PCT Pub. Date: May 26, 2017

(65) Prior Publication Data
US 2019/0264129 A1    Aug. 29, 2019

(30) Foreign Application Priority Data

Nov. 19, 2015 (JP) .................. 2015-226406

(51) Int. Cl.
| | |
|---|---|
| *C10M 169/04* | (2006.01) |
| *C09K 5/04* | (2006.01) |
| *C10M 107/34* | (2006.01) |
| *C10M 129/08* | (2006.01) |
| *C10M 129/16* | (2006.01) |
| *C10M 133/16* | (2006.01) |
| *C10M 141/06* | (2006.01) |
| *C10M 171/00* | (2006.01) |

(52) U.S. Cl.
CPC ............ *C10M 169/04* (2013.01); *C09K 5/04* (2013.01); *C09K 5/041* (2013.01); *C10M 107/34* (2013.01); *C10M 129/08* (2013.01); *C10M 129/16* (2013.01); *C10M 133/16* (2013.01); *C10M 141/06* (2013.01); *C10M 171/008* (2013.01); *C10M 2207/022* (2013.01); *C10M 2207/046* (2013.01); *C10M 2209/1033* (2013.01); *C10M 2209/1045* (2013.01); *C10M 2209/1055* (2013.01); *C10M 2209/1065* (2013.01); *C10M 2209/1075* (2013.01); *C10M 2209/1085* (2013.01); *C10M 2209/1095* (2013.01); *C10M 2215/08* (2013.01); *C10M 2215/28* (2013.01); *C10M 2223/041* (2013.01); *C10N 2220/021* (2013.01); *C10N 2220/022* (2013.01); *C10N 2220/302* (2013.01); *C10N 2220/303* (2013.01); *C10N 2220/305* (2013.01); *C10N 2220/306* (2013.01); *C10N 2230/06* (2013.01); *C10N 2230/08* (2013.01); *C10N 2240/30* (2013.01)

(58) Field of Classification Search
CPC .............. C10M 169/04; C10M 141/06; C10M 133/16; C10M 129/08; C10M 129/16; C10M 107/34; C10M 2215/28; C10M 2207/022; C10M 2207/046; C10M 2209/1055; C10M 2209/1045; C10M 2215/08; C10M 2209/1095; C10M 2209/1075; C10M 171/008; C10M 2223/041; C10M 2209/1033; C10M 2209/1085; C10M 2209/1065; C09K 5/041; C09K 5/04; C10N 2220/022; C10N 2240/30; C10N 2220/305; C10N 2040/30; C10N 2230/06; C10N 2220/021; C10N 2220/302; C10N 2220/306; C10N 2220/303; C10N 2230/08
USPC .......................... 252/68; 508/579, 583, 577
See application file for complete search history.

(56) References Cited

U.S. PATENT DOCUMENTS

| | | | | |
|---|---|---|---|---|
| 5,744,053 | A * | 4/1998 | Kaimai ................ | C10M 129/16 252/68 |
| 8,486,871 | B2 * | 7/2013 | Nagao .................. | C10M 107/24 508/110 |
| 8,491,811 | B2 * | 7/2013 | Kaneko ................ | C10M 169/04 252/68 |
| 2003/0032563 | A1 | 2/2003 | Tazaki | |
| 2007/0032391 | A1 | 2/2007 | Tagawa et al. | |
| 2007/0155635 | A1 | 7/2007 | Tagawa et al. | |
| 2009/0072187 | A1 * | 3/2009 | Kaneko .................. | C09K 5/041 252/68 |

(Continued)

FOREIGN PATENT DOCUMENTS

| | | |
|---|---|---|
| EP | 0 736 591 A2 | 10/1996 |
| EP | 1 881 057 A1 | 1/2008 |

(Continued)

OTHER PUBLICATIONS

International Search Report dated Dec. 20, 2016, in PCT/JP2016/084209 filed Nov. 18, 2016.

(Continued)

*Primary Examiner* — Douglas J McGinty
(74) *Attorney, Agent, or Firm* — Oblon, McClelland, Maier & Neustadt, L.L.P.

(57) ABSTRACT

The lubricating oil composition for a refrigerator of the present invention is used with a refrigerant containing carbon dioxide, and contains a base oil (A) containing a polyoxyalkylene glycol as a major component, and an alcohol (B) having at least one hydroxy group, in which a total number of the hydroxy group and an ether bond is from 2 to 3 (provided that the number of an ether bond may be 0).

17 Claims, No Drawings

(56) References Cited

U.S. PATENT DOCUMENTS

| | | | |
|---|---|---|---|
| 2009/0082232 A1 | 3/2009 | Ikeda et al. | |
| 2009/0082237 A1* | 3/2009 | Kaneko | C09K 5/041 508/591 |
| 2010/0025621 A1 | 2/2010 | Kaneko et al. | |
| 2010/0108936 A1* | 5/2010 | Kaneko | C10M 169/04 252/68 |
| 2010/0147016 A1* | 6/2010 | Kaneko | F04B 39/02 62/468 |
| 2010/0175421 A1* | 7/2010 | Kaneko | C09K 5/045 62/468 |
| 2011/0057146 A1* | 3/2011 | Kaneko | C09K 5/045 252/68 |
| 2011/0248206 A1* | 10/2011 | Kaneko | C10M 171/008 252/68 |

FOREIGN PATENT DOCUMENTS

| | | |
|---|---|---|
| JP | 2011-21870 A | 2/2011 |
| JP | 2011-21871 A | 2/2011 |
| JP | 2011-57885 A | 3/2011 |
| JP | 2011-58747 A | 3/2011 |
| JP | 2011-225896 A | 11/2011 |
| WO | WO 01/48127 A1 | 7/2001 |
| WO | WO 2005/012467 A1 | 2/2005 |
| WO | WO 2005/012469 A1 | 2/2005 |
| WO | WO 2006/120923 A1 | 11/2006 |
| WO | WO 2008/041549 A1 | 4/2008 |

OTHER PUBLICATIONS

Extended European Search Report dated Jun. 24, 2019 in corresponding European Patent Application No. 16866422.5, 7 pages.

Office Action dated Aug. 27, 2019 in Japanese Patent Application No. 2015-226406 (with unedited computer generated English translation).

Office Action as received JP Application No. 2015-226406 dated Feb. 12, 2020 w/attached partial computer generated English translation.

* cited by examiner

LUBRICATING OIL COMPOSITION FOR REFRIGERATOR, COMPOSITION FOR REFRIGERATOR, LUBRICATING METHOD, AND REFRIGERATOR

TECHNICAL FIELD

The present invention relates to a lubricating oil composition for a refrigerator used with a refrigerant containing carbon dioxide, a composition for a refrigerator containing a refrigerant containing carbon dioxide and the lubricating oil composition for a refrigerator, and a lubricating method and a refrigerator using them.

BACKGROUND ART

In general, a refrigerator is constituted by a compressor, a condenser, an expansion mechanism (such as, an expansion valve), and an evaporator, and further by a dryer, and has a structure, in which a mixture of a refrigerant and a refrigerator oil is circulated in a closed system. In a refrigerator, the mixed liquid of a refrigerant and a lubricating oil is used in a wide temperature range of from a low temperature to a high temperature since a high temperature occurs in a compressor, whereas a low temperature occurs in an evaporator and the like.

As a refrigerant used in a refrigerator in recent years, a refrigerant containing no chlorine is used as a refrigerant that does not deplete the ozone layer, and examples thereof used include fluorinated hydrocarbon refrigerants represented by 1,1,1,2-tetrafluoroethane (R134a), difluoromethane (R32), pentafluoroethane (R125), and 1,1,1-trifluoroethane (R143a).

As a refrigerant that has a low global warming potential, among the fluorinated hydrocarbon refrigerants, an unsaturated fluorinated hydrocarbon refrigerant, such as 1,3,3,3-tetrafluoropropene (HFO1234ze) and 2,3,3,3-tetrafluoropropene (HFO1234yf), are being used, for example, in a car air-conditioner and the like. Furthermore, carbon dioxide may be used in some cases for some purposes including a hot water supplier or the like since carbon dioxide is harmless to the environments and the human bodies, is easily available, and is unnecessary to recover.

The refrigerator oils vary in demanded characteristics depending on the refrigerant used, and base oils and additives added to the base oils have been developed corresponding to the refrigerants. For example, an unsaturated fluorinated hydrocarbon refrigerant may form a wax component in some cases through polymerization of the refrigerant and the base oil under a high-speed and high-load condition due to the low heat stability and the low chemical stability thereof. Accordingly, for example, PTLs 1 to 4 have studied the addition of a polymer paraffin inhibitor, such as ethylene glycol, for preventing the decomposition of the unsaturated fluorinated hydrocarbon refrigerant and the formation of a polymer paraffin due to the polymerization of the polymerizable decomposition product.

CITATION LIST

Patent Literatures

PTL 1: JP 2011-021870 A
PTL 2: JP 2011-021871 A
PTL 3: JP 2011-057885 A
PTL 4: JP 2011-058747 A

SUMMARY OF INVENTION

Technical Problem

It is being considered to expand the applications of the carbon dioxide refrigerant due to the harmlessness thereof to the environments and the like, and the use thereof, for example, in a car air-conditioner is being studied. In the case where carbon dioxide is used as a refrigerant in a refrigerator of a car air-conditioner or the like, the discharge pressure is higher than in the case where a fluorinated hydrocarbon refrigerant is used, and friction in a high-temperature and high-speed environment is assumed in a sliding portion of a compressor. Accordingly, a refrigerator oil that is used with a carbon dioxide refrigerant is demanded to have a further enhanced lubrication capability.

Furthermore, for enhancing the lubrication capability and the like of the refrigerator oil that is used with a carbon dioxide refrigerant, for example, it is considered to use a polyoxyalkylene glycol (PAG) as the base oil, and to add a friction modifier as an additive. However, the addition of a friction modifier to a PAG base oil may cause a problem of difficulty in practical use due to the deposition of the friction modifier under a low temperature environment.

The present invention has been made in view of the aforementioned problems, and an object thereof is to ensure the lubrication capability in a sliding portion in operation of a compressor of a refrigerator using carbon dioxide as a refrigerant, and also to suppress the deposition of a friction modifier under a low temperature environment in the case where the friction modifier is added to a refrigerator oil for enhancing the lubrication capability and the like.

Solution to Problem

As a result of earnest investigations by the present inventors, it has been found that the objects can be achieved by blending a prescribed alcohol with a polyoxyalkylene glycol base oil, and thus the present invention has been completed. The present invention provides a lubricating oil composition for a refrigerator shown below.

(1) A lubricating oil composition for a refrigerator, which is used with a refrigerant containing carbon dioxide, containing a base oil (A) containing a polyoxyalkylene glycol as a major component, and an alcohol (B) having at least one hydroxy group, in which a total number of the hydroxy group and an ether bond is from 2 to 3 (provided that the number of an ether bond may be 0).

The present invention also provides a composition for a refrigerator, a refrigerator, a lubricating method, and a method for producing a lubricating oil composition for a refrigerator shown below.

(2) A composition for a refrigerator, containing the lubricating oil composition for a refrigerator according to the item (1) and a refrigerant containing carbon dioxide.

(3) A refrigerator including charged therein the lubricating oil composition for a refrigerator according to the item (1) and a refrigerant containing carbon dioxide.

(4) A lubricating method for a refrigerator including charged therein the lubricating oil composition for a refrigerator according to the item (1) and a refrigerant containing carbon dioxide, including lubricating a sliding portion of the refrigerator with the lubricating oil composition for a refrigerator.

(5) A method for producing a lubricating oil composition for a refrigerator, which is used with a refrigerant containing carbon dioxide, including blending an alcohol (B) having at least one hydroxy group, in which a total number of the hydroxy group and an ether bond is from 2 to 3 (provided that the number of an ether bond may be 0), with a base oil (A) containing a polyoxyalkylene glycol as a major component.

Advantageous Effects of Invention

According to the present invention, the prescribed alcohol is blended with a polyoxyalkylene glycol base oil, and thereby the lubrication capability in a sliding portion of a compressor and the like can be ensured. In the case where a friction modifier, such as an amidoamine compound, is added, the deposition of the friction modifier under a low temperature environment can be suppressed while enhancing the lubrication capability and the like with the friction modifier.

DESCRIPTION OF EMBODIMENTS

The present invention will be described with reference to embodiments below.

<Lubricating Oil Composition for Refrigerator>

The lubricating oil composition for a refrigerator (refrigerator oil) according to one embodiment of the present invention is a lubricating oil composition for a refrigerator that is used with a refrigerant containing carbon dioxide, and contains a base oil (A) and an alcohol (B).

[Base Oil (A)]

The base oil (A) contains a polyoxyalkylene glycol (which may be hereinafter referred to as "PAG") as a major component. In the embodiment, the use of PAG as the base oil (A) is advantageous for the retention of the oil film under a high-temperature environment in the case where carbon dioxide is used as the refrigerant.

The PAG preferably has a kinetic viscosity at 100° C. of from 1 to 50 mm$^2$/s. When the PAG has a kinetic viscosity in the range, the lubrication capability of the lubricating oil composition for a refrigerator can be easily ensured while ensuring the energy saving capability and the flowability at a low temperature.

In this point of view, the kinetic viscosity at 100° C. of the PAG is more preferably from 3 to 30 mm$^2$/s, and further preferably from 5 to 25 mm$^2$/s.

The number average molecular weight of the PAG may be appropriately controlled corresponding to the kinetic viscosity, and is preferably from 300 to 5,000, more preferably from 500 to 5,000, and further preferably from 700 to 5,000.

The viscosity index of the PAG is preferably 100 or more. When the viscosity index is 100 or more, the lubricating oil composition for a refrigerator can easily retain a suitable viscosity over a range of from a low temperature to a high temperature. The viscosity index of the PAG is more preferably 120 or more, and further preferably 150 or more. The upper limit of the viscosity index of the PAG is not particularly determined, and is generally 400 or less.

More specific examples of the PAG include a compound represented by the following general formula (1).

  (1)

$$R^1[-(OR^2)_m-OR^3]_n \quad (1)$$

In the formula, R$^1$ represents a hydrogen atom, a monovalent hydrocarbon group having from 1 to 10 carbon atoms, an acyl group having from 2 to 10 carbon atoms, a hydrocarbon group having from 2 to 6 bonding sites and having from 1 to 10 carbon atoms, or an oxygen-containing hydrocarbon group having from 1 to 10 carbon atoms; R$^2$ represents an alkylene group having from 2 to 4 carbon atoms; R$^3$ represents a hydrogen atom, a hydrocarbon group having from 1 to 10 carbon atoms, an acyl group having from 2 to 10 carbon atoms, or an oxygen-containing hydrocarbon group having from 1 to 10 carbon atoms; n represents an integer of from 1 to 6; and m represents a number such that an average value of (m×n) is from 6 to 80.

In the general formula (1), the monovalent hydrocarbon group having from 1 to 10 carbon atoms in each of R$^1$ and R$^3$ may be any of straight-chain, branched-chain, and cyclic groups. The hydrocarbon group is preferably an alkyl group, and specific examples thereof include a methyl group, an ethyl group, an n-propyl group, an isopropyl group, butyl groups of every kind, pentyl groups of every kind, hexyl groups of every kind, heptyl groups of every kind, octyl groups of every kind, nonyl groups of every kind, decyl groups of every kind, a cyclopentyl group, and a cyclohexyl group. As for the aforementioned monovalent hydrocarbon group, when the number of carbon atoms is 10 or less, the compatibility with the refrigerant can be easily good. In this point of view, the number of carbon atoms of the monovalent hydrocarbon group is more preferably 1 to 4.

The hydrocarbon group moiety of the acyl group having from 2 to 10 carbon atoms in each of R$^1$ and R$^3$ may be any of straight-chain, branched-chain, and cyclic groups. The hydrocarbon group moiety of the acyl group is preferably an alkyl group, and specific examples thereof include alkyl groups having from 1 to 9 carbon atoms among the alkyl groups that may be selected as the groups represented by R$^1$ and R$^3$. When the number of carbon atoms of the acyl group is 10 or less, the compatibility with the refrigerant becomes good. The number of carbon atoms of the acyl group is preferably from 2 to 4.

In the case where all of R$^1$ and R$^3$ are hydrocarbon groups or acyl groups, the groups represented by R$^1$ and R$^3$ may be the same as or different from each other.

In the case where R$^1$ is the hydrocarbon group having from 2 to 6 bonding sites and having from 1 to 10 carbon atoms, the hydrocarbon group may be either chain-like or cyclic. The hydrocarbon group having 2 bonding sites is preferably an aliphatic hydrocarbon group, and examples thereof include an ethylene group, a propylene group, a butylene group, a pentylene group, a hexylene group, a heptylene group, an octylene group, a nonylene group, a decylene group, a cyclopentylene group, and a cyclohexylene group. Examples of the other hydrocarbon groups include a residue obtained by removing a hydroxy group from a bisphenol compound, such as bisphenol, bisphenol F, and bisphenol A. The hydrocarbon group having 3 to 6 bonding sites is preferably an aliphatic hydrocarbon group, and examples thereof include a residue obtained by removing a hydroxy group from a polyhydric alcohol, such as trimethylolpropane, glycerin, pentaerythritol, sorbitol, 1,2,3-trihydroxycyclohexane, and 1,3,5-trihydroxycyclohexane.

When the number of carbon atoms of the aliphatic hydrocarbon group is 10 or less, the compatibility with the refrigerant becomes good. The number of carbon atoms of the aliphatic hydrocarbon group is preferably from 2 to 6.

Examples of the oxygen-containing hydrocarbon group having 1 to 10 carbon atoms in each of R$^1$ and R$^3$ include a linear aliphatic group and a cyclic aliphatic group each having an ether bond (such as a tetrahydrofurfuryl group).

At least one of R$^1$ and R$^3$ is preferably an alkyl group, and particularly an alkyl group having from 1 to 4 carbon atoms.

$R^2$ in the general formula (1) is an alkylene group having from 2 to 4 carbon atoms, and examples of the oxyalkylene group as a repeating unit include an oxyethylene group, an oxypropylene group, and an oxybutylene group. The oxyalkylene groups in one molecule may be the same as each other, and two or more kinds of oxyalkylene groups may also be contained. It is preferred that at least an oxypropylene group unit is contained in one molecule, it is more preferred that the oxyalkylene units contain 50% by mol or more of oxypropylene group units, it is further preferred that the oxyalkylene units contain from 80 to 100% by mol or more of oxypropylene group units, and it is particularly preferred that the oxyalkylene units contain only oxypropylene group units.

In the general formula (1), n represents an integer of from 1 to 6, which is determined by the number of bonding sites of $R^1$. For example, in the case where $R^1$ is an alkyl group or an acyl group, n is 1, and in the case where $R^1$ is an aliphatic hydrocarbon group having 2, 3, 4, 5, or 6 bonding sites, n is 2, 3, 4, 5, or 6, respectively.

m represents a number that provides an average value of m×n of from 6 to 80. When the average value is 80 or less, the resultant base oil can exhibit lubricating performance and the compatibility with the refrigerant becomes good. The average value of m×n may be appropriately determined in such a manner that the viscosity of the aforementioned base oil is in the desired range.

n is preferably an integer of from 1 to 3, and more preferably 1.

In the case where n is 1, it is preferred that any one or both of $R^1$ and $R^3$ each represent an alkyl group having from 1 to 4 carbon atoms, and it is more preferred that both of them each represent an alkyl group having from 1 to 4 carbon atoms. In the case where n is 2 or more, it is preferred that at least one of the plural groups represented by $R^3$ in one molecule represents an alkyl group having from 1 to 4 carbon atoms, and it is more preferred that all of them each represent an alkyl group having from 1 to 4 carbon atoms. Examples of the alkyl group in this case include a methyl group, an ethyl group, a propyl group, and a butyl group, and a methyl group is most preferred. The propyl group and the butyl group each may be a straight-chain or branched-chain group.

In the case where n is 2 or more, the plural groups represented by $R^3$ in one molecule may be the same as or different from each other.

Specific examples of the PAG include compounds, in which $OR^2$ represents an oxypropylene group, n is 1, and both $R^1$ and $R^3$ each represent an alkyl group having from 1 to 4 carbon atoms, and among the compounds, a polyoxypropylene glycol dimethyl ether, in which both $R^1$ and $R^3$ are methyl groups, is most preferred.

The PAG described hereinabove may be used solely or as a combination of two or more kinds thereof.

The PAG is used as a major component of the base oil (A) contained in the lubricating oil composition for a refrigerator. The amount of the PAG may be from 50 to 100% by mass, and is preferably from 70 to 100% by mass, more preferably from 90 to 100% by mass, and most preferably 100% by mass, all based on the total amount of the base oil (A). Accordingly, it is most preferred that the base oil (A) is formed only of the PAG.

In the lubricating oil composition for a refrigerator, the base oil (A) may contain a base oil as a component other than the PAG. Examples of the base oil include a synthetic oil other than the PAG, and a mineral oil.

Examples of the synthetic oil other than the PAG include a poly-α-olefin, an α-olefin copolymer, a polybutene, an alkylbenzene, a GTL by-product wax isomerized oil, an ether compound other than the PAG and the alcohol (B) described later, and a polyester compound. Examples of the ether compound other than the PAG and the alcohol (B) described later include a polyvinyl ether (PVE) and a copolymer having a structure of a polyoxyalkylene glycol or a monoether thereof and a polyvinyl ether. Examples of the ester compound include an aliphatic monoester, an aliphatic diester, an aliphatic triester, and an aliphatic polyol ester. Examples of the mineral oil include a paraffin mineral oil, a naphthene mineral oil, and an intermediate base mineral oil. The synthetic oil and the mineral oil may be used solely or as a combination of two or more kinds thereof.

The base oil other than the PAG preferably has a kinetic viscosity at 100° C. of from 1 to 50 $mm^2/s$, more preferably from 3 to 30 $mm^2/s$, and further preferably from 5 to 25 $mm^2/s$, as similar to the PAG.

The content of the base oil (A) is preferably from 70 to 99.7% by mass, more preferably from 80 to 99.4% by mass, and further preferably from 90 to 99.0% by mass, based on the total amount of the lubricating oil composition for a refrigerator.

[Alcohol (B)]

The alcohol (B) is an alcohol compound that has at least one hydroxy group, in which a total number of the hydroxy group and an ether bond is from 2 to 3 (provided that the number of an ether bond may be 0). The incorporation of the alcohol (B) enables the lubricating oil composition for a refrigerator to be improved in seizing resistance and the like and have a good lubrication capability. In the case where the amidoamine compound (C) described later is contained, the alcohol (B) contained prevents the deposition of the amidoamine compound (C) under a low temperature environment.

When a total number of a hydroxy group and an ether bond is less than 2 or exceeds 4 in the alcohol (B), or the alcohol (B) does not have a hydroxy group, the lubrication capability may not be sufficiently enhanced, and furthermore the deposition of the amidoamine compound (C) described later may not be appropriately prevented in some cases.

The alcohol (B) may not have an ether bond (i.e., the number of an ether bond may be 0), and may have a number of an ether bond of from 0 to 2.

The number of a hydroxy group is preferably 1 or 2 in the alcohol (B) from the standpoint of improving the lubrication capability and preventing the deposition of the compound (C) more effectively. The number of an ether bond is preferably 1 or 2.

The alcohol (B) preferably has from 2 to 12 carbon atoms. When the alcohol compound (B) has 2 or more carbon atoms, the lubrication capability can be easily improved. When the number of carbon atoms is 12 or less, the deposition of the amidoamine compound (C) can be easily prevented. The number of carbon atoms of the alcohol (B) is more preferably from 3 to 10, and further preferably from 6 to 8, from the standpoint of enhancing the lubrication capability and the wear resistance and further preventing the deposition of the amidoamine compound (C).

Examples of the alcohol (B) include an alkanediol, a diol monoether compound having two hydroxy groups and one ether bond, and a monool diether compound having one hydroxy group and two ether bonds, and among these, a diol monoether compound and a monool diether compound are preferred.

Examples of the alkanediol include an alkanediol having from 2 to 12 carbon atoms, and specific examples thereof include ethylene glycol, propylene glycol, neopentyl glycol, 1,3-propanediol, 1,4-butanediol, 1,2-butanediol, 2-methyl-1,3-propanediol, 1,5-pentanediol, 1,6-hexanediol, 2-ethyl-2-methyl-1,3-propanediol, 2-methyl-2,4-pentanediol, 1,7-heptanediol, 2-methyl-2-propyl-1,3-propanediol, 2,2-diethyl-1,3-propanediol, 1,8-octanediol, 1,9-nonanediol, 2-butyl-2-ethyl-1,3-propanediol, 1,10-decanediol, 1,11-undecanediol, and 1,12-dodecanediol.

Examples of the diol monoether compound include a compound represented by the following formula (2).

$$HO-R^4-O-R^5-OH \quad (2)$$

In the formula (2), $R^4$ and $R^5$ each represent a divalent saturated aliphatic hydrocarbon group having from 2 to 6 carbon atoms, and $R^4$ and $R^5$ may be the same as or different from each other. $R^4$ and $R^5$ each may be a straight-chain or branched-chain group. In the formula (2), the numbers of carbon atoms of each of $R^4$ and $R^5$ each are more preferably from 2 to 4, further preferably from 2 to 3, and most preferably 3.

Specific examples of the diol monoether compound include dipropylene glycol, diethylene glycol, and dibutylene glycol.

Examples of the monool diether compound include a compound represented by the following formula (3).

$$HO-R^6-O-R^7-O-R^8 \quad (3)$$

In the formula (3), $R^6$ and $R^7$ each represent a divalent saturated aliphatic hydrocarbon group having from 2 to 4 carbon atoms, and $R^6$ and $R^7$ may be the same as or different from each other. $R^6$ and $R^7$ each may be a straight-chain or branched-chain group. $R^8$ represents an alkyl group having from 1 to 8 carbon atoms. $R^8$ may be a straight-chain or branched-chain group and may have a cyclic structure. The total number of carbon atoms of $R^6$ to $R^8$ is 12 or less.

In the formula (3), the numbers of carbon atoms of each of $R^6$ and $R^7$ each are more preferably from 2 to 3, and further preferably 2. The number of carbon atoms of $R^8$ is more preferably from 2 to 8, and further preferably from 3 to 6.

Specific examples of the monool diether compound include diethylene glycol monomethyl ether, diethylene glycol monoethyl ether, diethylene glycol monobutyl ether, diethylene glycol mono-2-ethylhexyl ether, dipropylene glycol monomethyl ether, and dipropylene glycol monoethyl ether.

In consideration of the availability and the like, preferred specific examples of the alcohol (B) include ethylene glycol, propylene glycol, diethylene glycol, dipropylene glycol, diethylene glycol monomethyl ether, diethylene glycol monoethyl ether, diethylene glycol monobutyl ether, diethylene glycol mono-2-ethylhexyl ether, dipropylene glycol monomethyl ether, and dipropylene glycol monoethyl ether. Since the lubrication capability can be easily enhanced while preventing the deposition of the friction modifier, dipropylene glycol and diethylene glycol monobutyl ether are more preferred.

The alcohol (B) is preferably contained in an amount of from 0.1 to 10% by mass based on the total amount of the lubricating oil composition for a refrigerator. With the use of the alcohol (B) within the range, the effect that corresponds to the amount thereof used can be easily exhibited. The content of the alcohol (B) is more preferably from 0.5 to 5% by mass, and further preferably from 1 to 3% by mass.

[Amidoamine Compound (C)]

The lubricating oil composition for a refrigerator preferably further contains an amidoamine compound (C) as a friction modifier. In the case where a refrigerant containing carbon dioxide is used, the discharge pressure is higher than in the case where a fluorinated hydrocarbon refrigerant is used, and a high-temperature and high-speed environment occurs in a sliding portion of a compressor. However, the amidoamine compound (C) used in the lubricating oil composition for a refrigerator may enhance the lubrication capability and may also improve the wear resistance. The amidoamine compound (C) liable to be deposited under a low temperature environment, but the deposition can be suppressed by blending the aforementioned alcohol (B) with the lubricating oil composition for a refrigerator.

Specific examples of the amidoamine compound (C) include an aliphatic amidoamine compound having one or more amido group and one or more amino group.

Examples of the aliphatic amidoamine compound include a compound represented by the following formula (4).

$$R^9-CO-NR^{10}R^{11} \quad (4)$$

In the formula, $R^9$ represents an alkyl group having from 6 to 30 carbon atoms or an alkenyl group having from 6 to 30 carbon atoms, $R^{10}$ and $R^{11}$ each represent a hydrogen atom, a hydrocarbon group having from 1 to 10 carbon atoms, an amino group-containing hydrocarbon group having from 1 to 10 carbon atoms, or an oxygen atom-containing hydrocarbon group having from 1 to 10 carbon atoms, and at least one of $R^{10}$ and $R^{11}$ represents an amino group-containing hydrocarbon group. $R^{10}$ and $R^{11}$ may be the same as or different from each other. The alkyl group and the alkenyl group represented by $R^9$ each may be a straight-chain or branched-chain group and may have a cyclic structure. The hydrocarbon group and the hydrocarbon moiety in $R^{10}$ and $R^{11}$ each may be a straight-chain or branched-chain group, may have a cyclic structure, and may contain an aromatic ring, an unsaturated bond, and the like, and it is preferred that an aromatic ring and an unsaturated bond are not contained.

Examples of the compound represented by the formula (4) include an amidoamine compound that is a reaction product of a fatty acid and a polyamine. Specific examples of the fatty acid include stearic acid, isostearic acid, oleic acid, lauric acid, myristic acid, palmitic acid, and a coconut oil fatty acid, and among these, stearic acid, oleic acid, and isostearic acid are preferred.

The polyamine means a compound having two or more amino groups, and the amine groups each may constitute any of a primary amine, a secondary amine, and a tertiary amine, in which at least one of the amino groups constitutes a primary amine or a secondary amine for performing reaction with the fatty acid. Examples of the polyamine include a compound having three or more amino groups, such as tetraethylenepentamine and triethylenetetramine, and a compound having two amino groups, such as diethylaminoethylamine and trimethylethylenediamine.

Among the compounds described above, an amidoamine compound that is a reaction product of a fatty acid and a polyamine having two amino groups is preferred. Specific examples thereof include a compound represented by the following formula (5).

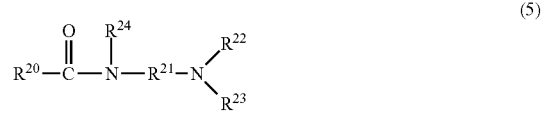

$$R^{20}-\overset{O}{\underset{\|}{C}}-\underset{|}{N}-R^{21}-N\overset{R^{22}}{\underset{R^{23}}{\diagdown}} \quad (5)$$

In the formula (5), $R^{20}$ represents an alkyl group having from 6 to 30 carbon atoms or an alkenyl group having from 6 to 30 carbon atoms; $R^{21}$ represents an alkylene group having from 1 to 4 carbon atoms; $R^{22}$ and $R^{23}$ each represent a hydrogen atom or an alkyl group having from 1 to 4 carbon atoms, and may be the same as or different from each other; and $R^{24}$ represents a hydrogen atom or a methyl group.

In the formula (5), the number of carbon atoms of $R^{20}$ is preferably from 11 to 23, and more preferably from 13 to 21.

The number of carbon atoms of the alkylene group represented by $R^{21}$ is preferably a number of carbon atoms of from 1 to 3, more preferably a number of carbon atoms of 2 or 3, and particularly preferably a number of carbon atoms of 2. The alkylene group in $R^{21}$ may be a straight-chain or branched-chain group. It is preferred that both $R^{22}$ and $R^{23}$ each are an alkyl group, it is more preferred that both $R^{22}$ and $R^{23}$ each are an alkyl group having from 1 to 3 carbon atoms, and it is particularly preferred that both $R^{22}$ and $R^{23}$ each are an alkyl group having 2 carbon atoms. The alkyl group represented by $R^{22}$ and $R^{23}$ may be a straight-chain or branched-chain group. $R^{24}$ is preferably a hydrogen atom.

In the amidoamine compound described above, a reaction product of a fatty acid having 18 carbon atoms and diethylaminoethylamine is particularly preferred. In other words, a compound represented by the formula (5), wherein $R^{20}$ has a number of carbon atoms of 17, $R^{21}$ represents an alkylene group having 2 carbon atoms; $R^{22}$ and $R^{23}$ represent alkyl groups having 2 carbon atoms; and $R^{24}$ represents a hydrogen atom, is particularly preferred.

The amidoamine compound (C) is preferably contained in an amount of from 0.03 to 5% by mass, more preferably from 0.05 to 3% by mass, and further preferably from 0.1 to 1% by mass, based on the total amount of the lubricating oil composition for a refrigerator.

When the content of the amidoamine compound (C) is the aforementioned lower limit value or more, the lubrication capability and the wear resistance of the lubricating oil composition for a refrigerator can be appropriately enhanced. When the content thereof is the aforementioned upper limit value or less, the deposition of the amidoamine compound (C) can be easily suppressed in combination with the use of the component (B).

[Additional Additives]

The lubricating oil composition for a refrigerator according to the embodiment may contain one kind or two or more kinds of additional additives other than the component (B) and the component (C), such as an antioxidant, an oiliness improver, an extreme pressure agent, an acid scavenger, an oxygen scavenger, a copper deactivator, a rust inhibitor, and an anti-foaming agent.

Accordingly, the lubricating oil composition for a refrigerator may be formed of the base oil (A) and the alcohol (B), may be formed of the base oil (A), the alcohol (B), and the amidoamine compound (C), may be formed of the base oil (A), the alcohol (B), and the additional additive, and may be formed of the base oil (A), the alcohol (B), the amidoamine compound (C), and the additional additive.

The content of the additional additive is preferably 20% by mass or less, and more preferably 0% by mass or more and 10% by mass or less, based on the lubricating oil composition for a refrigerator. The term 0% by mass means that the additional additive is not contained in the lubricating oil composition for a refrigerator.

Examples of the antioxidant include a phenol antioxidant, such as 2,6-di-tert-butyl-4-methylphenol, 2,6-di-tert-butyl-4-ethylphenol, and 2,2'-methylenebis(4-methyl-6-tert-butylphenol), and an amine antioxidant, such as phenyl-α-naphthylamine and N,N'-diphenyl-p-phenylenediamine. The content of the antioxidant is generally from 0.01 to 5% by mass, and preferably from 0.05 to 3% by mass, based on the total amount of the lubricating oil composition for a refrigerator, from the standpoint of the effect, the economical efficiency, and the like.

Examples of the oiliness improver include an aliphatic saturated or unsaturated monocarboxylic acid, such as stearic acid and oleic acid, a polymerized fatty acid, such as a dimer acid and a hydrogenated dimer acid, a hydroxy fatty acid, such as ricinoleic acid and 12-hydroxystearic acid, an aliphatic saturated or unsaturated monohydric alcohol, such as lauryl alcohol and oleyl alcohol, an aliphatic saturated or unsaturated monoamine, such as stearylamine and oleylamine, an aliphatic saturated or unsaturated monocarboxylic acid amide, such as lauric acid amide and oleic acid amide, and a partial ester of a polyhydric alcohol, such as glycerin and sorbitol, and an aliphatic saturated or unsaturated monocarboxylic acid.

These compounds may be used solely or as a combination of two or more kinds thereof. The content thereof may be selected generally from a range of from 0.01 to 10% by mass, and preferably from a range of from 0.1 to 5% by mass, based on the total amount of the lubricating oil composition for a refrigerator.

Examples of the extreme pressure agent include a phosphorus extreme pressure agent, such as a phosphate ester, an acidic phosphate ester, a phosphite ester, an acidic phosphite ester, and amine salts thereof.

Examples of the phosphorus extreme pressure agent include tricresyl phosphate, trithiophenyl phosphate, tri(nonylphenyl) phosphite, dioleyl hydrogen phosphite, and 2-ethylhexyldiphenyl phosphite, from the standpoint of the extreme pressure property, the frictional characteristics, and the like.

Examples of the extreme pressure agent also include a metal salt of a carboxylic acid. The metal salt of a carboxylic acid referred herein is preferably a metal salt of a carboxylic acid having from 3 to 60 carbon atoms, and further a fatty acid having from 3 to 30 carbon atoms, and particularly from 12 to 30 carbon atoms. Examples thereof also include metal salts of a dimer acid and a trimer acid of the fatty acid, and a dicarboxylic acid having from 3 to 30 carbon atoms. Among these, metal salts of a fatty acid having from 12 to 30 carbon atoms and a dicarboxylic acid having from 3 to 30 carbon atoms are particularly preferred.

The metal constituting the metal salt is preferably an alkali metal or an alkaline earth metal, and particularly an alkali metal may be optimum.

Examples of the extreme pressure agent other than those described above include a sulfur extreme pressure agent, such as a sulfurized oil or fat, a sulfurized fatty acid, a sulfurized ester, a sulfurized olefin, a dihydroxycarbyl polysulfide, a thiocarbamate compound, a thioterpene compound, and a dialkyl thiodipropionate compound.

The extreme pressure agent is preferably a phosphorus extreme pressure agent among the above.

The content of the extreme pressure agent is generally from 0.001 to 5% by mass, and particularly from 0.005 to 3% by mass, based on the total amount of the lubricating oil composition for a refrigerator, from the standpoint of the lubrication capability and the stability.

The extreme pressure agent may be used solely or as a combination of two or more kinds thereof.

Examples of the acid scavenger include an epoxy compound, such as phenyl glycidyl ether, an alkyl glycidyl ether, an alkylene glycol glycidyl ether, cyclohexene oxide, an a-olefin oxide, and an epoxidized soybean oil. Among these, from the standpoint of the compatibility, phenyl glycidyl ether, an alkyl glycidyl ether, an alkylene glycol glycidyl ether, cyclohexene oxide, and an α-olefin oxide are preferred.

The alkyl group in the alkyl glycidyl ether and the alkylene group in the alkylene glycol glycidyl ether each may be branched, and the number of carbon atoms thereof is generally from 3 to 30, preferably from 4 to 24, and particularly preferably from 6 to 16. The α-olefin oxide used generally has a total number of carbon atoms of from 4 to 50, preferably from 4 to 24, and particularly from 6 to 16. In the embodiment, the acid scavenger may be used solely, or may be used as a combination of two or more kinds thereof. The content thereof is generally from 0.005 to 5% by mass, and preferably from 0.05 to 3% by mass, based on the total amount of the lubricating oil composition for a refrigerator, from the standpoint of the effect and the inhibition of sludge generation.

In the embodiment, the acid scavenger contained may enhance the stability of the lubricating oil composition for a refrigerator.

Examples of the oxygen scavenger include a sulfur-containing aromatic compound, such as 4,4'-thiobis(3-methyl-6-t-butylphenol), diphenyl sulfide, dioctyldiphenyl sulfide, a dialkyldiphenylene sulfide, benzothiophene, dibenzothiophene, phenothiazine, benzothiapyrane, thiapyrane, thianthrene, dibenzothiapyrane, and diphenylene disulfide, an aliphatic unsaturated compound, such as various olefins, dienes, and trienes, and a terpene compound having a double bond. The content of the oxygen scavenger is generally from 0.005 to 5% by mass, and preferably from 0.05 to 3% by mass, based on the total amount of the lubricating oil composition for a refrigerator.

Examples of the copper deactivator include an N-[N,N'-dialkyl(alkyl group having 3 to 12 carbon atoms)aminomethyl]triazole.

Examples of the rust inhibitor include a metal sulfonate, an aliphatic amine compound, an organic phosphite ester, an organic phosphate ester, an organic sulfonic acid metal salt, an organic phosphoric acid metal salt, an alkenyl succinate ester, and a polyhydric alcohol ester. The content of the rust inhibitor is generally from 0.005 to 2% by mass, and preferably from 0.01 to 1% by mass, based on the total amount of the lubricating oil composition for a refrigerator.

Examples of the anti-foaming agent include a silicone oil and a fluorinated silicone oil. The content of the anti-foaming agent is generally from 0.005 to 2% by mass, and preferably from 0.01 to 1% by mass, based on the total amount of the lubricating oil composition for a refrigerator.

Among the additional additives described above, the extreme pressure agent is preferably used from the standpoint of the enhancement of the lubrication capability, the wear resistance, and the like.

The lubricating oil composition for a refrigerator according to the embodiment may further contain various other known additives within a range that does not impair the object of the present invention.

The lubricating oil composition for a refrigerator preferably has an acid value of 0.2 mgKOH/g or less, a pour point of −20° C. or less, and a nitrogen content of 300 ppm or less.

With an acid value of 0.2 mgKOH/g or less, the lubricating oil composition for a refrigerator has an advantage that the deterioration phenomenon thereof at a high temperature due to an acid as a catalyst can be suppressed. With a pour point of −20° C. or less, an excellent low temperature capability can be obtained in combination with the prevention of the deposition of the amidoamine compound (C) under a low temperature environment described above. With a nitrogen content of 300 ppm or less, an advantage can be obtained that the formation of sludge derived from a nitrogen component can be suppressed.

The acid value of the lubricating oil composition for a refrigerator is more preferably from 0 to 0.15 mgKOH/g, and further preferably from 0 to 0.10 mgKOH/g. The pour point thereof is more preferably −30° C. or less, and further preferably −40° C. or less. The pour point thereof is preferably as low as possible, and the lower limit thereof is not particularly determined, and is generally −60° C. or more.

The nitrogen content thereof is more preferably 250 ppm or less, and further preferably 200 ppm or less. Due to the amidoamine compound (C) blended in an appropriate amount, the nitrogen content is preferably 50 ppm or more, more preferably 100 ppm or more, and further preferably 120 ppm or more.

<Method for Producing Lubricating Oil Composition for Refrigerator>

The lubricating oil composition for a refrigerator may be produced by blending at least the alcohol (B) with the base oil (A). With the base oil (A), the amidoamine compound (C) is preferably further blended, and an additional additive other than the components (B) and (C) may also be blended. The details of the components (A) to (C) and the additional additives have been described above. The order of blending these components is not particularly limited.

<Refrigerant>

The lubricating oil composition for a refrigerator is used in combination with a refrigerant. In other words, a composition for a refrigerator containing the lubricating oil composition for a refrigerator and a refrigerant is used in a refrigerator. The amounts of the refrigerant and the lubricating oil composition for a refrigerator used in a refrigerator are generally from 99/1 to 10/90 in terms of mass ratio (refrigerant)/(lubricating oil composition for refrigerator), and is preferably in a range of from 95/5 to 30/70. When the mass ratio is in the range, the refrigeration capability and the lubrication capability of the refrigerator can be made appropriate.

The refrigerant used is a refrigerant that contains carbon dioxide. The refrigerant is preferably a refrigerant that contains carbon dioxide solely, and may be a mixed refrigerant containing carbon dioxide and a refrigerant other than carbon dioxide.

The content of carbon dioxide in the mixed refrigerant is preferably from 20 to 99% by mass, more preferably from 50 to 99% by mass, and further preferably from 80 to 99% by mass, based on the total amount of the refrigerant.

Examples of the refrigerant other than carbon dioxide used in the mixed refrigerant include one kind or two or more kinds selected from the group consisting of a fluorinated hydrocarbon compound, a hydrocarbon compound, and ammonia.

[Fluorinated Hydrocarbon Compound]

Examples of the fluorinated hydrocarbon compound include a saturated fluorinated hydrocarbon compound and an unsaturated fluorinated hydrocarbon compound.

The saturated fluorinated hydrocarbon compound is generally a fluorinated compound of an alkane having from 1 to 4 carbon atoms, preferably a fluorinated compound of an alkane having from 1 to 3 carbon atoms, and more preferably a fluorinated compound of an alkane having from 1 to 2 carbon atoms (i.e., methane or ethane). Specific examples of the fluorinated compound of methane or ethane include trifluoromethane (R23), difluoromethane (R32), 1,1-difluoroethane (R152a), 1,1,1-trifluoroethane (R143a), 1,1,2-trifluoroethane (R143), 1,1,1,2-tetrafluoroethane (R134a), 1,1,2,2-tetrafluoroethane (R134), and 1,1,1,2,2-pentafluoroethane (R125).

The saturated fluorinated hydrocarbon compound may be used solely or as a combination of two or more kinds thereof.

Examples of the unsaturated fluorinated hydrocarbon compound include compounds having a carbon-carbon double bond, such as a fluorinated compound of a straight-chain or branched-chain olefin having from 2 to 6 carbon atoms and a fluorinated compound of a cyclic olefin having from 4 to 6 carbon atoms.

More specific examples thereof include an ethylene compound having from 1 to 3 fluorine atoms introduced thereto, a propene compound having from 1 to 5 fluorine atoms introduced thereto, a butene compound having from 1 to 7 fluorine atoms introduced thereto, a pentene compound having from 1 to 9 fluorine atoms introduced thereto, a hexene compound having from 1 to 11 fluorine atoms introduced thereto, a cyclobutene compound having from 1 to 5 fluorine atoms introduced thereto, a cyclopentene compound having from 1 to 7 fluorine atoms introduced thereto, and a cyclohexene compound having from 1 to 9 fluorine atoms introduced thereto.

Among the unsaturated fluorinated hydrocarbon compounds, a fluorinated compound of propene is preferred, a propene compound having from 3 to 5 fluorine atoms introduced thereto is more preferred, and a propene compound having 4 fluorine atoms introduced thereto is most preferred. Specific examples of the preferred compound include 1,3,3,3-tetrafluoropropene (HFO1234ze) and 2,3,3,3-tetrafluoropropene (HFO1234yf).

The unsaturated fluorinated hydrocarbon compound may be used solely or as a combination of two or more kinds thereof.

[Hydrocarbon Compound]

Examples of the hydrocarbon compound include hydrocarbon compounds having from 3 to 7 carbon atoms, such as propane (R290), n-butane, isobutane (R600a), cyclobutane, n-pentane, 2-methylbutane, 2,2-dimethylpropane, cyclopentane, n-hexane, 2-methylpentane, 2,2-dimethylbutane, 2,3-dimethylbutane, 3-methylpentane, cyclohexane, n-heptane, and cycloheptane.

The hydrocarbon compound may be used solely or as a combination of two or more kinds thereof.

As the refrigerant other than carbon dioxide, among the compounds described above, a saturated fluorinated hydrocarbon compound, a hydrocarbon compound, and ammonia are preferred, and R134a, R32, R290, R600a, and ammonia are more preferred.

<Refrigerator>

The lubricating oil composition for a refrigerator is used in a refrigerator, and specifically is used in a compression refrigerator equipped with a compressor.

The refrigerator has the lubricating oil composition for a refrigerator charged in the interior thereof, and a sliding portion of the refrigerator, such as a lubricating portion of a compressor, is lubricated with the lubricating oil composition for a refrigerator. The refrigerator has a refrigerant charged in the interior thereof in addition to the lubricating oil composition for a refrigerator (i.e., has a composition for a refrigerator charged therein), and the composition for a refrigerator is circulated in the system of the refrigerator. The compression refrigerator has, in addition to the compressor, at least a condenser, an expansion mechanism (such as an expansion valve), and an evaporator, by which the refrigeration cycle is constituted.

The lubricating oil composition for a refrigerator can be applied to various refrigerators in a refrigeration system, a hot water supply system, and a heating system such as a car air-conditioner, e.g., an open type car air-conditioner and an electric car air-conditioner, a gas heat pump (GHP), an air-conditioner, a refrigerating chamber, an automatic vending machine, and a showcase, and is preferably applied to a car air-conditioner among these.

EXAMPLES

The present invention will be described in more detail with reference to examples below, but the present invention is not limited to the examples.

The measurement methods and the evaluation methods in the description herein are as follows.

(1) Kinetic Viscosity (100° C.)

The kinematic viscosity was measured with a glass capillary viscometer according to JIS K2283:2000.

(2) Viscosity Index

The viscosity index was measured according to JIS K2283:2000.

(3) Number Average Molecular Weight (Mn)

The number average molecular weight (Mn) was measured with gel permeation chromatography (GPC). In the GPC, the measurement was performed by using two columns of TSKgel SuperMultipore HZ-M, produced by Tosoh Corporation, tetrahydrofuran as an eluent, and a refractive index detector as a detector, and the number average molecular weight (Mn) was obtained with polystyrene as the standard sample.

(4) Acid Value

The acid value was measured by the indicator method according to "Lubricating oil neutralization test method" defined in JIS K2501:2003.

(5) Pour Point

The pour point was measured according to JIS IC2269:1987.

(6) Nitrogen Content

The nitrogen content was measured according to JIS K2609:1998.

(7) Sealed FALEX Test

A FALEX coating seizing test was performed under condition of SUJ2 block/SUJ2 pin, a load of 150 lbs. (667 N), an oil amount (coated) of 20 μL, a rotation number of 450 rpm, 0.1 MPa of carbon dioxide as a refrigerant, and a temperature of 23° C., and a period of time until the occurrence of seizing was measured.

(8) Low Temperature Accelerated Storage Test

The lubricating oil composition for a refrigerator was placed in a sealable vessel and stored under environments at −5° C. and −40° C. respectively for 30 days, and thereafter the presence of deposition of the additive (i.e., the amidoamine compound) was visually observed. In the case where no deposition was observed at both the temperatures, the lubricating oil composition for a refrigerator was evaluated as "A" since a sufficient deposition suppressing effect was obtained. In the case where deposition was observed at any of the temperatures, but the deposition was slight, the lubricating oil composition for a refrigerator was evaluated as "B". In the case where a relatively large amount of deposition was observed at any of the temperatures, the lubricating oil composition for a refrigerator was evaluated as "C".

Examples 1 to 9 and Comparative Example 1

In Examples and Comparative Example, lubricating oil compositions for a refrigerator having the compositions shown in Table 2 were prepared, and the lubricating oil compositions for a refrigerator were evaluated. The evaluation results are shown in Table 2.

The base oil (A) used in Examples and Comparative Example was polyoxypropylene glycol dimethyl ether (which was a PAG represented by the general formula (1), wherein n is 1, m is a value corresponding to the number average molecular weight, $R^1$ and $R^3$ are methyl groups, and $OR^2$ is an oxypropylene group), which had a kinetic viscosity at 100° C. of 9.7 mm²/s, a number average molecular weight of 1,100, and a viscosity index of 207.

The alcohols (B) and the amido compound (C) used in Examples and Comparative Example are shown in Table 1.

TABLE 1

| | Structural formula | Name of compound |
|---|---|---|
| Alcohol 1 | HO–CH₂CH₂CH₂–O–CH₂CH₂CH₂–OH | dipropylene glycol |
| Alcohol 2 | HO–CH₂CH₂–OH | ethylene glycol |
| Alcohol 3 | HO–CH₂–CH(OH)–CH₃ | propylene glycol |
| Alcohol 4 | HO–CH₂CH₂–O–CH₂CH₂–OH | diethylene glycol |
| Alcohol 5 | HO–CH₂CH₂–O–CH₂CH₂–O–C₄H₉ | diethylene glycol monobutyl ether |
| Alcohol 6 | 2-ethylhexyl–O–CH₂CH₂–O–CH₂CH₂–OH | diethylene glycol mono-2-ethylhexyl ether |
| Amidoamine compound | $C_{17}H_{35}-C(=O)-NH-C_2H_4-N(C_2H_5)_2$ | stearic acid diethylaminoethylamide |

TABLE 2

| | | Example 1 | Example 2 | Example 3 | Example 4 | Example 5 |
|---|---|---|---|---|---|---|
| Composition | Base oil (PAG) | 97.90 | 97.40 | 96.90 | 95.90 | 97.90 |
| | Alcohol 1 | 1.00 | 1.50 | 2.00 | 3.00 | |
| | Alcohol 2 | | | | | 1.00 |
| | Alcohol 3 | | | | | |
| | Alcohol 4 | | | | | |
| | Alcohol 5 | | | | | |
| | Alcohol 6 | | | | | |
| | Amidoamine compound | 0.20 | 0.20 | 0.20 | 0.20 | 0.20 |
| | Extreme pressure agent | 0.90 | 0.90 | 0.90 | 0.90 | 0.90 |
| Evaluation results | Acid value (mgKOH/g) | 0.05 | 0.05 | 0.05 | 0.05 | 0.05 |
| | Pour point (° C.) | −50> | −50> | −50> | −50> | −50> |
| | Nitrogen content (ppm) | 160 | 160 | 160 | 160 | 160 |
| | FALEX seizing time (min) | 25.3 | 26.3 | 30.0 | 36.0 | 23.0 |
| | Low temperature accelerated storage test (−5° C. × 1 month) | no deposition | no deposition | no deposition | no deposition | no deposition |
| | Low temperature accelerated storage test (−40° C. × 1 month) | no deposition | no deposition | no deposition | no deposition | no deposition |
| | Deposition suppressing effect | A | A | A | A | A |

| | | Example 6 | Example 7 | Example 8 | Example 9 | Comparative Example 1 |
|---|---|---|---|---|---|---|
| Composition | Base oil (PAG) | 97.90 | 97.90 | 97.90 | 97.90 | 98.90 |
| | Alcohol 1 | | | | | |
| | Alcohol 2 | | | | | |
| | Alcohol 3 | 1.00 | | | | |

TABLE 2-continued

|  |  |  |  |  |  |  |
|---|---|---|---|---|---|---|
|  | Alcohol 4 |  | 1.00 |  |  |  |
|  | Alcohol 5 |  |  | 1.00 |  |  |
|  | Alcohol 6 |  |  |  | 1.00 |  |
|  | Amidoamine compound | 0.20 | 0.20 | 0.20 | 0.20 | 0.20 |
|  | Extreme pressure agent | 0.90 | 0.90 | 0.90 | 0.90 | 0.90 |
| Evaluation results | Acid value (mgKOH/g) | 0.05 | 0.05 | 0.05 | 0.05 | 0.05 |
|  | Pour point (° C.) | −50> | −50> | −50> | −50> | −50> |
|  | Nitrogen content (ppm) | 160 | 160 | 160 | 160 | 160 |
|  | FALEX seizing time (min) | 23.5 | 23.2 | 28.8 | 29.7 | 22.4 |
|  | Low temperature accelerated storage test (−5° C. × 1 month) | no deposition | no deposition | no deposition | slight deposition found | deposition found |
|  | Low temperature accelerated storage test (−40° C. × 1 month) | no deposition | no deposition | no deposition | slight deposition found | deposition found |
|  | Deposition suppressing effect | A | A | A | B | C |

The values in the compositions each show the amount in terms of percentage by mass based on the total amount of the lubricating of composition for a refrigerator.
Extreme pressure agent: tricresyl phosphate In Examples 1 to 9, with the alcohol (B) blended, the seizing time in the FALEX test was prolonged, and the lubrication capability was improved. In Examples 1 to 9, though the amidoamine compound (C) was blended, the amidoamine compound (C) was suppressed from being deposited under a low temperature environment by the blend of the alcohol (B) in combination with the amidoamine compound (C).

In Comparative Example 1, on the other hand, the seizing time in the FALEX test was not sufficiently prolonged and the lubrication capability was not sufficiently improved, since the alcohol (B) was not blended. Furthermore, the amidoamine compound (C) was disadvantageously deposited in a large amount under a low temperature environment.

The invention claimed is:

1. A lubricating oil composition, comprising:
    (A) a base oil (A) comprising a polyoxyalkylene glycol as a major component;
    (B) an alcohol (B) having at least one hydroxy group, in which a total number of the hydroxy group and an ether bond is from 2 to 3, provided that the number of an ether bond may be 0; and
    (C) an amidoamine compound (C),
    wherein a content of the alcohol (B) is from 1 to 10% by mass based on a total amount of the lubricating oil composition,
    wherein a content of the amidoamine compound (C) is from 0.03 to 5% by mass based on a total amount of the lubricating oil composition.

2. The lubricating oil composition according to claim 1, wherein the alcohol (B) is contained in an amount of from 1 to 5% by mass based on the total amount of the lubricating oil composition for a refrigerator.

3. The lubricating oil composition according to claim 1, wherein the alcohol (B) has from 2 to 12 carbon atoms.

4. The lubricating oil composition according to claim 1, wherein the alcohol (B) has 1 or 2 hydroxy groups.

5. The lubricating oil composition according to claim 1, wherein the alcohol (B) has 1 or 2 ether bonds.

6. The lubricating oil composition according to claim 1, wherein the amidoamine compound (C) is contained in an amount of from 0.05 to 3% by mass based on the total amount of the lubricating oil composition for a refrigerator.

7. The lubricating oil composition according to claim 1, wherein the refrigerant comprises carbon dioxide solely, or is a mixed refrigerant comprising carbon dioxide and at least one compound selected from the group consisting of a fluorinated hydrocarbon compound, a hydrocarbon compound, and ammonia.

8. The lubricating oil composition according to claim 1, wherein the polyoxyalkylene glycol has a kinetic viscosity at 100° C. of from 1 to 50 $mm^2/s$.

9. The lubricating oil composition according to claim 1, further comprising:
    at least one selected from the group consisting of an antioxidant, an oiliness improver, an extreme pressure agent, an acid scavenger, an oxygen scavenger, a copper deactivator, a rust inhibitor, and an anti-foaming agent.

10. The lubricating oil composition according to claim 1, having an acid value of 0.2 mgKOH/g or less, a pour point of −20° C. or less, and a nitrogen content of 300 ppm or less.

11. A system, comprising the lubricating oil composition according to claim 1,
    wherein the system is a refrigeration system, a hot water supply system, or a heating system selected from the group consisting of a car air-conditioner, a gas heat pump, an air-conditioner, a refrigerating chamber, an automatic vending machine, and a showcase.

12. A composition, comprising:
    the lubricating oil composition according to claim 1; and
    a refrigerant containing carbon dioxide.

13. A refrigerator, comprising:
    the lubricating oil composition according to claim 1 charged therein; and
    a refrigerant comprising carbon dioxide.

14. A method, comprising:
    lubricating a sliding portion of a refrigerator with the lubricating oil composition of claim 1,
    wherein the lubricating oil composition is charged within the refrigerator with a refrigerant comprising carbon dioxide.

15. A method for producing a lubricating oil composition, the method comprising:
    blending an alcohol (B) having at least one hydroxy group, in which a total number of the hydroxy group and an ether bond is from 2 to 3, provided that the number of an ether bond may be 0, and an amidoamine compound (C) with a base oil (A) comprising a polyoxyalkylene glycol as a major component,
    wherein a content of the alcohol (B) is from 1 to 10% by mass based on a total amount of the lubricating oil composition, wherein a content of the amidoamine compound (C) is from 0.03 to 5% by mass based on a total amount of the lubricating oil composition.

16. The lubricating oil composition according to claim 1, wherein the content of the alcohol (B) is from 1 to 3% by mass based on a total amount of the lubricating oil composition, and
wherein the content of the amidoamine compound (C) is from 0.1 to 1% by mass based on a total amount of the lubricating oil composition.

17. A lubricating oil composition, comprising:
(A) a base oil (A) comprising a polyoxyalkylene glycol as a major component;
(B) an alcohol (B) represented by formula (2) and/or formula (3):

$$HO-R^4-O-R^5-OH \qquad (2)$$

wherein $R^4$ and $R^5$ each independently represent a divalent saturated aliphatic hydrocarbon group having from 2 to 6 carbon atoms; and $$HO-R^6-O-R^7-O-R^8 \qquad (3)$$

wherein $R^6$ and $R^7$ each independently represent a divalent saturated aliphatic hydrocarbon group having from 2 to 4 carbon atoms; and
(C) an amidoamine compound (C),
wherein a content of the alcohol (B) is from 1 to 10% by mass based on a total amount of the lubricating oil composition,
wherein a content of the amidoamine compound (C) is from 0.03 to 5% by mass based on a total amount of the lubricating oil composition.

* * * * *